Patented Aug. 23, 1949

2,480,079

UNITED STATES PATENT OFFICE 2,480,079

RING CLEAVAGE OF 4-CARBOXYTHIAZOLIDINE COMPOUNDS

James H. Hunter and Byron E. Leach, Kalamazoo, Mich., assignors to The Upjohn Company, Kalamazoo, Mich., a corporation of Michigan No Drawing. Application August 8, 1945,
Serial No. 609,720

5 Claims. (Cl. 260—516)

This invention relates to a method for ring cleavage of thiazolidine compounds, particularly to ring cleavage of 4-carboxythiazolidine compounds and to certain new N-substituted alpha-amino beta-thiol carboxylic acids obtained thereby.

The relationship which exists between the structure of certain 4-carboxythiazolidine compounds, i. e., of organic compounds containing a thiazolidine ring with a carboxyl radical as a substituent in the 4-position, and certain of the structural formulae which have been proposed for penicillin contributes to the importance of reactions involving these compounds. Especially valuable are reactions involving the cleavage or opening of the thiazolidine ring in such compounds which lead to structures of a simpler type without substantial disturbance of substituents attached to the thiazolidine ring or of other parts of a complex molecule of which a thiazolidine ring may form a part.

It has now been found that, when a 4-carboxythiazolidine compound is treated with an alkali metal dissolved in liquid ammonia, cleavage of the thiazolidine ring is effected between the sulfur atom and the carbon atom in the 2 position, i. e., the carbon atom between the sulfur and the nitrogen atoms in the ring, with the addition of two hydrogen atoms to the molecule and the formation of an N-substituted alpha-amino beta-thiol carboxylic acid, or in some instances, of the corresponding disulfide, i. e., an N-substituted beta,beta'-dithio bis-alpha-amino carboxylic acid. The reaction, as exemplified by the conversion of 5,5-dimethylthiazolidine-4-carboxylic acid to N-methylpenicillamine, may be represented as follows:

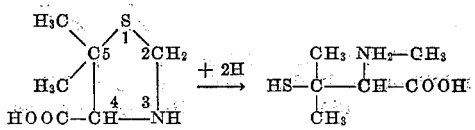

Inasmuch as the cleavage of a thiazolidine ring according to the present process involves the introduction of two hydrogen atoms into the molecule the reaction may be thought of as a species of reduction, and the terms "reduction" and "cleavage" are used interchangeably herein, it being understood that in each instance cleavage of the ring occurs.

In most instances substituent groups or radicals on the thiazolidine ring are not displaced or altered during the reduction, provided they are not of themselves reactive under the conditions of the treatment of the 4-carboxythiazolidine compound with alkali metal in liquid ammonia. Beta,beta'-dithio bis-alpha-amino carboxylic acids isolated from the reaction mixture may be reduced to the corresponding thiol compounds in known manner. It appears that, generally, the thiol compound is formed initially during the reduction with an alkali metal but that, unless precautions are taken to exclude air during the recovery of the product, oxidation occurs in many instances and a dithio compound rather than a thiol compound is obtained by following normal procedures of recovery. Although any alkali metal, e. g., sodium, lithium or potassium, may be used in the process, the use of sodium is preferred and the invention will be described with particular reference thereto.

Inasmuch as a 4-carboxythiazolidine compound may be formed readily by condensing an appropriate alpha-amino beta-thiol carboxylic acid with an appropriate aldehyde or ketone, it is apparent that the method of the invention offers a convenient and easy way for the introduction of a wide variety of substituent groups into the amino group of an alpha-amino beta-thiol carboxylic acid. By condensing an alpha-amino beta-thiol carboxylic acid with an aldehyde of the type RCHO, wherein R represents an organic radical, a 4-carboxythiazolidine compound is obtained having a single substituent radical on the carbon atom in the second position in the ring and this compound, upon reduction with sodium in liquid ammonia, is converted smoothly to an N-substituted alpha-amino beta-thiol acid, or the corresponding disulfide, wherein the substituent introduced into the amino group is of the type —CH₂R. When the aldehyde employed is formaldehyde, the substituent introduced into the amino group is a methyl radical. The reaction, as exemplified by the conversion of penicillamine to 5,5-dimethylthiazolidine-4-carboxylic acid by formaldehyde, may be reprsented as follows:

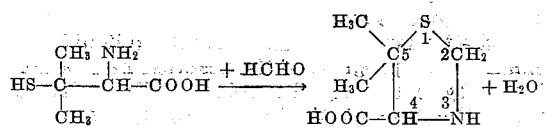

By employing a ketone of the type R—CO—R, wherein both R's represent the same or different organic radicals, rather than an aldehyde in the condensation step, the substituent introduced into the amino group is of the type —CHRR. The employment of a cyclic ketone, wherein the carbon atom of the carbonyl group is a part of the ring structure, is exemplified by the use of cyclohexanone, the substituent introduced into the amino group in this case being simply the cyclohexyl radical, —C₆H₁₁.

A wide variety of aldehydes and ketones, such as formaldehyde, acetaldehyde, butyraldehyde, benzaldehyde, phenylacetaldehyde, a c e t o n e, methyl ethyl ketone, methyl butyl ketone, acetophenone, phenylacetone, propiophenone, cyclohexanone, and many others may be employed in the condensation step and the resulting 4-carboxythiazolidine compound reduced with sodium in liquid ammonia to cleave the thiazolidine ring.

Alpha-amino beta-thiol carboxylic acids which may be condensed with an aldehyde or ketone to form a 4-carboxythiazolidine compound include cysteine, penicillamine (2-amino-3-thiol-3-methyl-butyric acid, having the formula

HS—C(CH₃)₂—CH(NH₂)—COOH and alpha-amino beta-thiol carboxylic acids, generally, which contain no other substituent radicals reactive under the condensation conditions. Furthermore mono-N-substituted alpha-amino beta-thiol carboxylic acids, such as N-methyl cysteine, N-methyl penicillamine and the like, may be employed to form an N-substituted 4-carboxythiazolidine compound and the latter reduced with sodium in liquid ammonia with the formation of ring cleavage products, such as di-N-substituted alpha-amino beta-thiol carboxylic acids or corresponding disulfides. A preferred embodiment of the invention involves the reduction of a 4-carboxythiazolidine compound derived from an aldehyde or ketone and an alpha-amino beta-thiol aliphatic carboxylic acid.

Condensation of an aldehyde or a ketone with an alpha-amino beta-thiol carboxylic acid is effected readily by mixing the two substances, usually in substantially equi-molecular proportions, and allowing the mixture to stand, frequently with gentle heating. A solvent in which both substances are soluble, e. g., alcohol, or, in some cases, water or mixtures thereof, may be incorporated in the mixture to facilitate handling and purification of the product, if desired. The crude product may be purified by crystallization, e. g., from aqueous alcohol. A hydrohalide, e. g., the hydrochloride, of an alpha-amino beta-thiol carboxylic acid may be employed in the reaction if desired and a hydrohalide of a 4-carboxythiazolidine separated from the reaction mixture, or the free 4-carboxythiazolidine may be liberated from the hydrohalide by treatment with a chemically equivalent amount of an alkali, e. g., sodium carbonate, pyridine or sodium hydroxide.

Reduction of a 4-carboxythiazolidine compound with cleavage of the thiazolidine ring is effected easily with sodium in liquid ammonia under atmospheric pressure, although higher or lower pressures may be employed if desired. The reaction is carried out conveniently by adding metallic sodium and a 4-carboxythiazolidine compound alternately in small amounts to liquid ammonia. The progress of the reaction may be followed by observing the color of the mixture. When the amount of dissolved sodium is in excess, the mixture has the characteristic blue color of an ammonia solution of sodium and when the dissolved 4-carboxythiazolidine compound is in excess the blue color no longer persists. The reagents are preferably added in such proportion that a slight excess of sodium is present in the mixture after all of the 4-carboxythiazolidine compound has been added. The reduction takes place rapidly and substantially quantitatively. From about 2 to about 3 gram-atoms of sodium is required for each mol of 4-carboxythiazolidine compound.

When the reduction is complete, the excess sodium may be destroyed, e. g., by adding a small amount of solid carbon dioxide or ammonium chloride, and the product recovered in any one of a number of ways. Thus the ammonia may be volatilized, the residue taken up in aqueous hydrochloric acid and the product recovered as a solid hydrochloride. For most purposes the free amine compound or its hydrochloride may be employed with equal facility. However, the free amine compound may be isolated in substantially pure form from the hyrochloride by treating the latter dissolved in a small amount of methanol or water with approximately one chemical equivalent of ammonia, filtering, and washing the precipitate carefully with a little methanol. Other ways of recovering the cleavage products are apparent to those familiar with the art and the present invention is not limited as to such recovery methods.

Certain advantages of the invention are apparent from the following examples which are given by way of illustration only and are not to be construed as limiting.

*Preparation 1.—Levo-5,5-dimethylthiazolidine-4-carboxylic acid*

To a solution of 11.8 grams (0.064 mol) of l-penicillamine hydrochloride in 22 milliliters of water was added 10 milliliters of commercial formalin. A precipitate appeared within about one-half hour. The resulting mixture was allowed to stand overnight at room temperature. To the reaction mixture was then added 10 milliliters of pyridine and 20 milliliters of ethanol and, after refrigerating for one hour, the precipitate was collected. Concentration of the mother liquid and treatment with ethanol yielded a second crop of crude material. The combined crude product was crystallized from aqueous ethanol. Yield, 9.0 grams (82 per cent); M. P. 193–194° C.

Anal. Calcd. for C₆H₁₁O₂NS: C, 44.70; H, 6.99; N, 8.69; S, 19.88. Found: C, 45.23; H, 7.27; N, 8.98; S, 21.67.

*Preparation 2.—Dextro-5,5-dimethylthiazolidine-4-carboxylic acid*

Preparation 1 was repeated using d-penicillamine hydrochloride instead of the l-isomer with substantially identical results.

*Preparation 3.—N-methyl 5,5-dimethyl-thiazolidine-4-carboxylic acid hydrochloride*

To a solution of 400 milligrams of N-methyl l-penicillamine hydrochloride in 1.5 milliliters of water was added 0.5 milliliter of commercial formalin solution. After filtration, the solution was dried in vacuo over solid sodium hydroxide. The crude hydrochloride crystallized gradually. The crude product was recrystallized from absolute ethanol-ether, M. P., 191–192° C. after softening at 188° C.

*Preparation 4.—N-methyl-thiazolidine-4-carboxylic acid hydrochloride*

This compound was prepared by condensing N-methyl cysteine hydrochloride (HS—CH₂—CH(NH(CH₃).HCl)—COOH)

with formaldehyde substantially as by the method of Preparation 3. The compound melted at 180–181° C. after softening at 177° C.

Anal. Calcd. for C₅H₁₀O₂NSCl: C, 32.70; H, 5.49; N, 7.63; S, 17.46; Cl, 19.13. Found: C, 32.82; H, 5.50; N, 8.11; S, 18.50; Cl, 18.66.

*Preparation 5.—Levo-2,2-dimethyl-thiazolidine-4-carboxylic acid*

Acetone was condensed with levo-cysteine hydrochloride following the same procedure as in Preparation 1 and the product isolated in substantially pure form melting at 137°–138° C.

*Example 1.—N-methyl levo-penicillamine hydrochloride*

To approximately 150 milliliters of liquid ammonia 3.8 grams (0.0236 mol) of l-5,5-dimethyl-thiazolidine-4-carboxylic acid (Preparation 1) and 1.24 grams (0.0537 gram-atom) of metallic sodium (cut in small pieces) were added in alternate small amounts with adequate stirring. When sufficient sodium had been added to just produce a permanent blue color, the latter was discharged by the addition of a small lump of dry ice. Essentially all the ammonia was allowed to evaporate spontaneously; the final traces were removed by drying in vacuo over concentrated sulfuric acid.

The white residue was taken up in about 75 milliliters of water and acidified carefully with concentrated hydrochloric acid. The solution was taken to dryness in vacuo, the residue was redissolved in water, and the solution again evaporated to dryness in vacuo. After repeating this procedure once more, most of the excess hydrochloric acid had been removed. The residue was extracted three times with 50 milliliter portions of commercial absolute ethanol and the combined filtered extracts evaporated in vacuo. The syrupy residue was redissolved in 50 milliliters of commercial absolute ethanol, filtered and evaporated slowly in a stream of nitrogen. The last traces of solvent were removed by drying the syrup in vacuo whereupon solidification occurred slowly. Yield, 3.7 grams (78.6 per cent); M. P., unsharply from 80° to 120° C.

Anal. Calcd. for C₆H₁₄O₂NSCl: C, 36.08; H, 7.07; N, 7.01; S, 16.05; Cl, 17.76; NCH₃, 7.53. Found: C, 35.93; H, 7.38; N, 7.28; S, 15.15; Cl, 17.88; NCH₃, 7.63.

*Example 2.—N-methyl-levo-penicillamine*

Two hundred and forty-eight milligrams (0.00125 mol) of N-methyl l-penicillamine hydrochloride (Example 1) was dissolved in about 0.5 milliliter of methanol and to the resulting solution, 3 drops of concentrated ammonia water were added with stirring. The precipitate was centrifuged, washed with a small amount of methanol and dried. M. P. 208°–210° C. after darkening at 205° C.

*Example 3.—N-methyl dextro-penicillamine hydrochloride*

Substantially the procedure of Example 1 was employed in reducing d-5,5-dimethyl-thiazolidine-4-carboxylic acid (Preparation 2). A 57 per cent yield was obtained of N-methyl d-penicillamine melting at 160°–170° C. without purification.

Anal. Calcd. for C₆H₁₄O₂NSCl: C, 36.08; H, 7.07; N, 7.01. Found: C, 35.48; H, 7.46; N, 7.32.

*Example 4.—N-isopropyl-levo-cysteine hydrochloride*

Using the procedure described in Example 1, l-2,2-dimethylthiazolidine-4-carboxylic acid (Preparation 5) was reduced with sodium in liquid ammonia. A 68 percent yield of an impure, exceedingly hygroscopic solid was obtained the analysis of which agrees substantially with the calculated values of N-isopropyl l-cysteine hydrochloride.

Anal. Calcd. for C₆H₁₄O₂NSCl: C, 36.08; H, 7.07; N, 7.01; S, 16.05; Cl, 17.76. Found: C, 34.68; H, 7.81; N, 6.44; S, 14.66; Cl, 16.45.

*Example 5.—Cleavage of 2-phenylthiazolidine-4-carboxylic acid with sodium in liquid ammonia*

2-phenylthiazolidine-4-carboxylic acid (4.46 grams; 0.0213 mol) was treated with 1.13 grams (0.0491 gram-atom) of freshly cut metallic sodium in 150 milliliters of liquid ammonia. After discharging the blue color with ammonium chloride, the ammonia was allowed to evaporate. The residue was slurried in water and the insoluble portion (3.35 grams) collected and dried. Purification was effected by dissolving the crude material in normal hydrochloric acid solution and precipitating it by the addition of one equivalent of normal sodium hydroxide solution. The resulting white powder, M. P. 202 C. (dec.), failed to give a positive sulfhydryl test with ferric chloride and gave only a weak test with nitroprusside, but after standing in alkaline solution with sodium cyanide for ten minutes, both color reactions were strongly positive. Analytical data indicate the product to be N,N′-dibenzyl cystine.

Anal. Calcd. for C₂₀H₂₄O₄N₂S₂: C, 57.12; H, 5.75; N, 6.88; S, 15.25. Found: C, 56.62; H, 5.81; N, 6.89; S, 15.19.

*Example 6.—Cleavage of 2-benzylthiazolidine-4-carboxylic acid with sodium in liquid ammonia*

Following the procedure of Example 5, 4.18 grams (0.0188 mol) of 2-benzylthiazolidine-4-carboxylic acid was treated with 1.00 gram (0.0435 gram-atom) of metallic sodium in approximately 150 milliliters of liquid ammonia. The yield of water-insoluble product was 3.55 grams. This material was only sparingly soluble in dilute or concentrated hydrochloric acid, but readily soluble in dilute alkali. After repeated reprecipitation from normal sodium hydroxide, the tan powder melted with decomposition at 221°–223° C. The color tests for sulfhydryl were either negative or very weak. However, after reaction with sodium cyanide in alkaline solution, strong positive tests were observed with both ferric chloride and nitroprusside. The composition of the material corresponds closely with that of N,N′-di-b-phenethyl cystine.

Anal. Calcd. for C₂₂H₂₈O₄N₂S₂: C, 58.90; H, 6.29; N, 6.25; S, 14.30. Found: C, 58.79; H, 6.33; N, 6.41; S, 14.39.

We claim:

1. A process for the production of a cysteine derivative which comprises the reduction with an alkali metal in liquid ammonia solution of a thiazolidine-4-carboxylic acid of the group consisting of 5,5-dimethylthiazolidine-4-carboxylic acid, 2,2-dimethylthiazolidine-4-carboxylic acid, 2-phenylthiazolidine-4-carboxylic acid, and 2-benzylthiazolidine-4-carboxylic acid, and subsequent recovery therefrom of the cysteine derivative.

2. A process as defined in claim 1 in which the alkali metal is sodium.

3. A process for the production of an N-methyl-penicillamine which comprises the reduction of 5,5-dimethylthiazolidine-4-carboxylic acid in solution in liquid ammonia with sodium metal and subsequent recovery of the N-methylpenicillamine.

4. A process for the production of an N-isopropylcysteine which comprises the reduction of a 2,2-dimethylthiazolidine-4-carboxylic acid in solution in liquid ammonia with sodium metal and subsequent recovery of the N-isopropylcysteine.

5. A process for the production of N,N'-dibenzylcystine which comprises the reduction of 2-phenylthiazolidine-4-carboxylic acid in solution in liquid ammonia with sodium metal and subsequent recovery of the N,N'-dibenzylcystine.

JAMES H. HUNTER.
BYRON E. LEACH.

REFERENCES CITED

The following references are of record in the file of this patent:

UNITED STATES PATENTS

| Number | Name | Date |
|---|---|---|
| 2,364,398 | Stevenson | Dec. 5, 1944 |
| 2,376,186 | Rapkine | May 15, 1945 |
| 2,406,362 | Farlow | Aug. 27, 1946 |

OTHER REFERENCES

Schubert, "J. Biol. Chem.," vol. 11 (1935), pp. 671 to 678.

Patterson et al., "J. Biol. Chem.," vol. III (1935), pp. 393–398. (Copy in Division 6.)

Woodward, "J. Am. Chem. Soc.," vol. 59 (1937), pp. 1690–1694.

Ratner et al., "J. Am. Chem. Soc.," vol. 59 (1937), p. 204.

Bloch et al., "J. Biol. Chem.," vol. 125 (1938), pp. 275, 282.

Micheel, "Ber. deut. Chem.," vol. 72 (1939), pp. 1728, 1729.

Carter et al., "J. Biol. Chem.," vol. 139 (1941), pp. 252, 253.

Catch et al., "Nature," vol. 150 (1942), p. 634.

Abraham et al., "Br. J. of Exper. Pathology," vol. 23, June 1942, pp. 106, 107, 113. (Available in Lib. of Cong.)